Sept. 28, 1965  J. W. ORENDORFF  3,208,536
FOLDING AGRICULTURAL IMPLEMENT
Filed Sept. 9, 1963  3 Sheets-Sheet 1
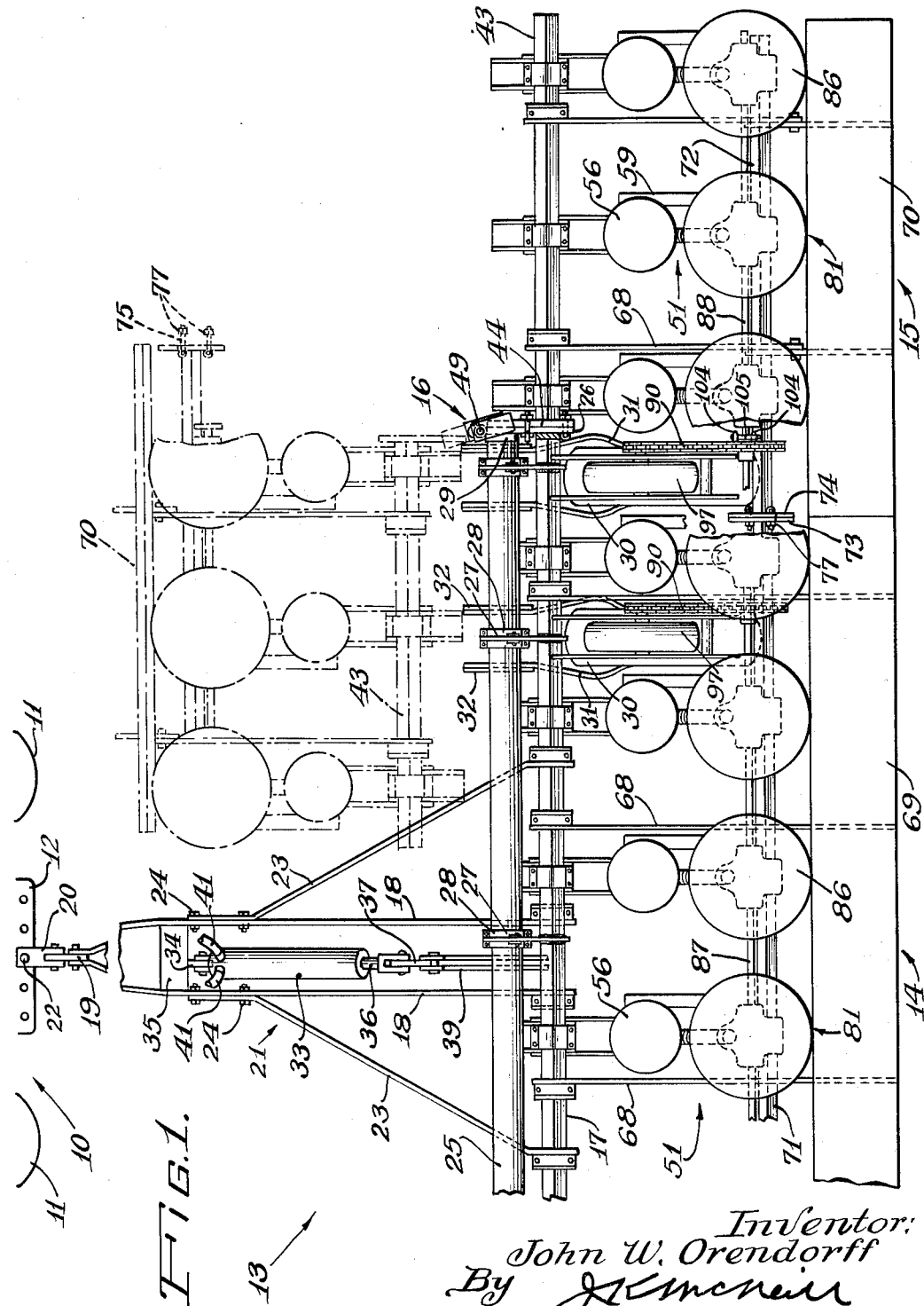
Inventor:
John W. Orendorff
By J. K. McNeill
Atty.

Sept. 28, 1965  J. W. ORENDORFF  3,208,536
FOLDING AGRICULTURAL IMPLEMENT
Filed Sept. 9, 1963  3 Sheets-Sheet 2
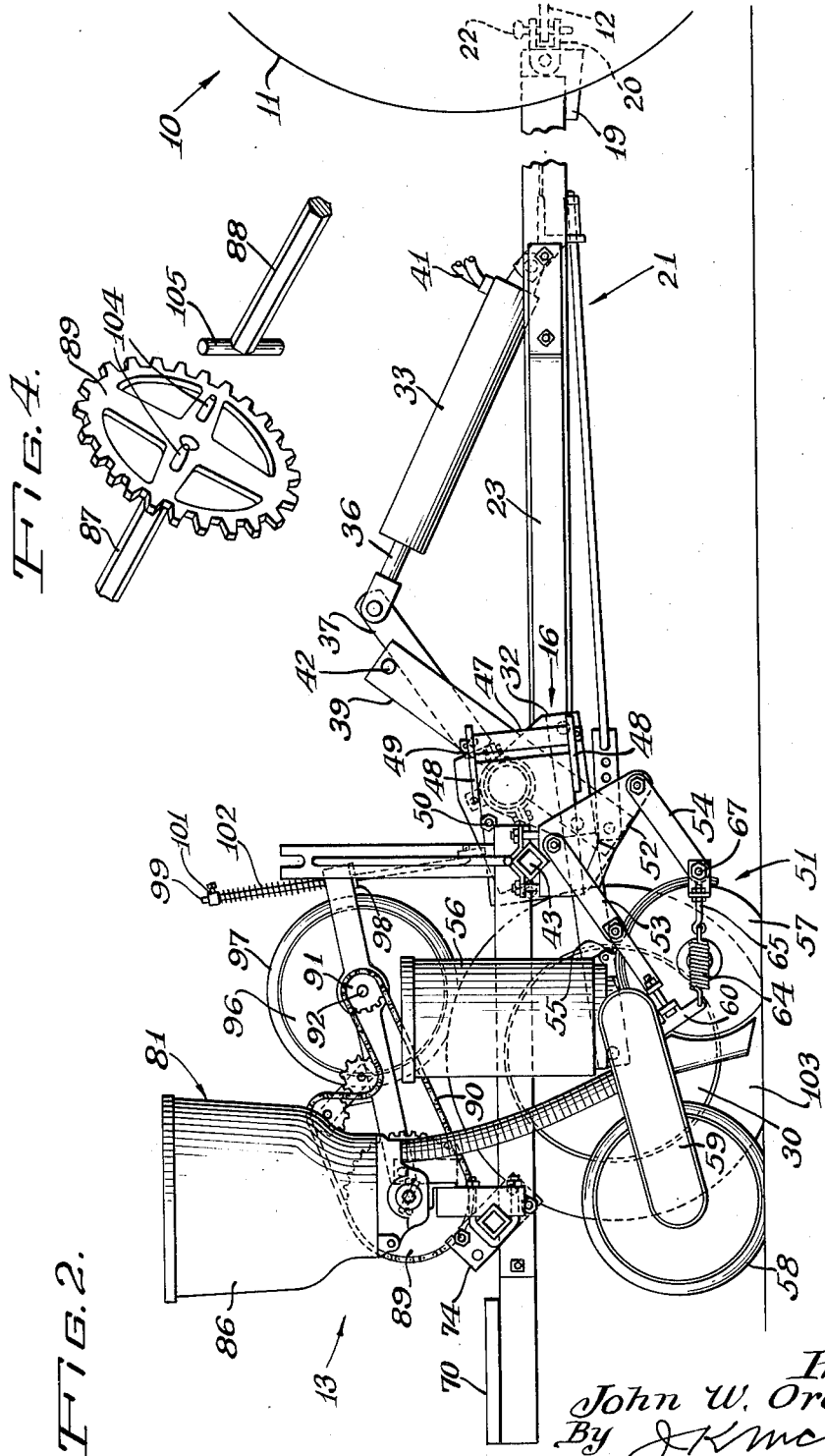
Inventor:
John W. Orendorff
By J K McNeill
Atty.

Sept. 28, 1965 J. W. ORENDORFF 3,208,536
FOLDING AGRICULTURAL IMPLEMENT
Filed Sept. 9, 1963 3 Sheets-Sheet 3
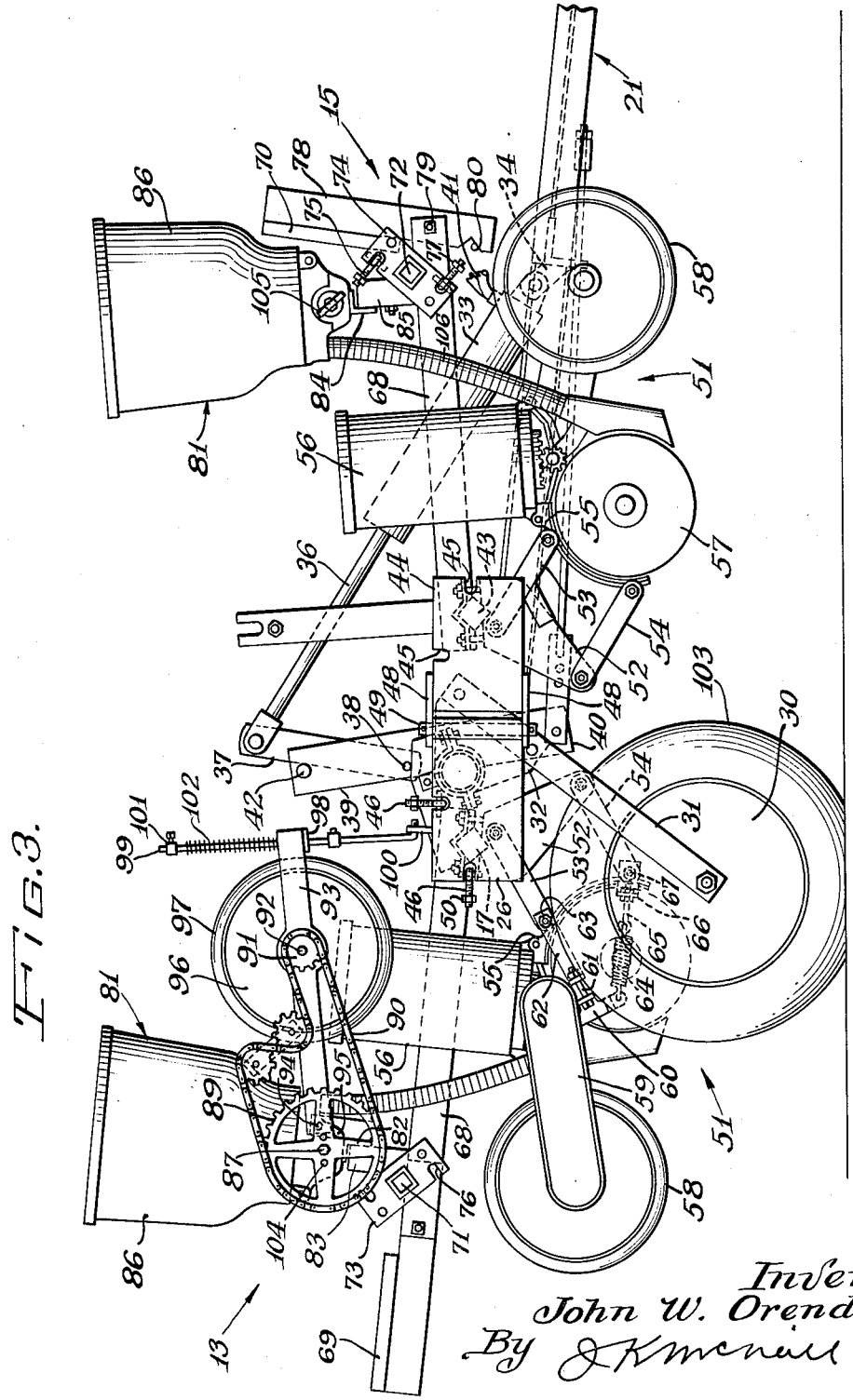
Inventor:
John W. Orendorff
By J K McNeill
Atty.

United States Patent Office 3,208,536
Patented Sept. 28, 1965

3,208,536
FOLDING AGRICULTURAL IMPLEMENT
John W. Orendorff, Downers Grove, Ill., assignor to International Harvester Company, Chicago, Ill., a corporation of New Jersey
Filed Sept. 9, 1963, Ser. No. 307,414
4 Claims. (Cl. 172—456)

This invention relates to agricultural implements and particularly to large implements of the folding wing type. More specifically, the invention concerns a folding wing planter.

The implement incorporating the features of this invention as described herein is a multi-row planter of the trail-behind type adapted to be pivotally connected to a tractor drawbar at a fixed height above the ground for vertical and lateral swinging movement relative to the tractor. The implement frame structure extends transversely of the direction of travel and is mounted on wheels, the frame being vertically movable relative to the wheels to raise and lower the frame about the pivotal connection thereof to the tractor. In an implement having folding end or wing sections, the folding of the wings causes parts thereof to engage the ground in transport. Furthermore, the weight of the end section causes it to sag when folded, resulting in damage to the implement.

An object of the invention, therefore, is the provision of a folding wing implement of novel construction wherein the wing sections swing in a horizontal plane to a folded non-operating or transport position about a vertical axis that is tilted when the implement is raised to maintain the implement substantially level for transport purposes.

Another object of the invention is the provision of a folding wing type planter of novel construction wherein the wing sections fold forwardly relative to the main or central sections to a position where a portion of the frame cooperates with the wing sections to support the free ends thereof during transport.

Another object of the invention is the provision, in a planter of the folding wing type having dispensing elements thereon, of novel means for transmitting drive from the central section drive shaft to the wing section shafts, wherein the driving connection between said shafts is automatically broken when the wings are folded and automatically re-engaged when the wings are returned to their operating position.

Other objects and advantages of the invention will become clear from the following detailed description when read in conjunction with the accompanying drawings wherein:

FIGURE 1 is a plan view with parts removed of a portion of a folding wing type planter incorporating the features of this invention;

FIGURE 2 is an enlarged side elevation of the structure shown in FIGURE 1, with the planting elements in their operating position;

FIGURE 3 is a view similar to FIGURE 2 with the implement raised to its non-operating transport position, and FIGURE 4 is an enlarged detail of a portion of the planter drive shaft and the automatically connectible and disconnectible means by which motion is imparted to the wing shaft from the main or central section shaft.

In the drawings the numeral 10 designates a tractor having drive wheels 11 and a drawbar 12 to which is connected an agricultural implement in the form of a planter 13. The supporting frame of the planter includes a transversely extending main or central section 14, and at each end thereof a folding end frame section or wing 15, only one of which is shown, connected to the central section by hinge means 16 to be hereinafter more fully described.

Central frame section 14 comprises a forward transversely extending square tool bar 17 to which are secured the rear ends of a pair of forwardly extending bars 18 which converge at their forward ends and have secured thereto a depending plate 19 carrying a clevis 20 and forming part of an implement hitch structure generally designated at 21.

Clevis 20 is pivotally connected by a pin 22 to the drawbar 12 of the tractor for both lateral and vertical swinging movement of the implement relative to the tractor. Drawbar 12 of the tractor is maintained at a selected elevation above the ground and when the implement is raised and lowered it moves in an arc vertically about the pivot axis of hitch frame 21 on the drawbar 12.

Also forming a part of the hitch frame 21 is a pair of forwardly converging bracing bars 23, the rear ends of which are affixed to tool bar 17 and the forward ends of which are bent into parallel planes and secured to draft bars 18 by bolts 24, converging hitch bars 23 serving an additional purpose hereinafter to be described.

Also forming a part of central frame section 14 is a tubular member 25 in advance of and parallel to tool bar 17 affixed thereto by end plates 26 and clamps 27, each of which is affixed to tool bar 17 at one end and carries a bearing 28 at its other end to rotatably support pipe 25, each end of which is received in a sleeve 29 affixed to plate 26.

The implement frame is supported upon laterally spaced pairs of ground-engaging wheels 30 each of which is mounted upon the lower ends of arms 31, the upper ends of which are affixed to plates 32 secured to pipe member 25. Rocking of pipe 25 in bearings 28 thus causes arms 31 to swing in a vertical plane relative to the central frame section 14 to vertically move the latter as well as the wing sections 15 between lowered or operating and raised or transport positions. Raising and lowering of the implement about the pivotal connection thereof to the tractor drawbar is accomplished by the provision of power operated means in the form of a hydraulic cylinder 33 anchored at one end to a lug 34 affixed to a brace 35 extending between hitch bars 18 and having a piston rod 36 slidable therein and pivotally connected to a link 37 pivotally mounted at 38 upon a pair of arms 39 forming a lever affixed to pipe 25 and having a portion 40 projecting therebelow.

Fluid under pressure is supplied to cylinder 33 from a source, not shown, on tractor 10 through hose lines 41 to extend and retract piston rod 36 in cylinder 33. As shown in FIGURE 3, extension of the rod in the cylinder causes link 37 to abut a pin 42 at the upper end of lever 39 and rock the lever in a counterclockwise direction as viewed in FIGURES 2 and 3 to swing the wheel arms 31 downwardly relative to the implement frame and vertically move the planter structure from the operating position of FIGURE 2 to the transport position of FIGURE 3. Retraction of the piston rod in the cylinder allows the implement frame structure to lower by its own weight.

Wing section 15 comprises a square tool bar 43 in transverse alignment with tool bar 17 and having a plate 44 affixed to its inner end adapted to mate with plate 26. Plate 44 is provided with slots 45 adapted to receive bolts 46 pivotally mounted on plate 26 to lock the tool bars 17 and 43 into a rigid unit.

In order to decrease the width of the implement for transport purposes, each of the wings 15 is adapted to fold into the dotted line position shown in FIGURE 1 with tool bar 43 in tandem with and parallel to tool bar 17. This is accomplished by providing plate 26 with a bearing sleeve 47 received between a pair of vertically spaced ears 48 secured to plate 44 and having apertures registering with the opening in sleeve 47 to receive a pivot pin 49.

Plates 26 and 44 are secured together tightly by nuts 50 carried by bolts 46, and upon loosening these nuts the wing is swingable in a horizontal plane to the non-operating or transport position shown in dotted lines in FIGURE 1.

A plurality of planting units 51 are mounted at laterally spaced locations on the implement frame by means including for each unit a depending plate 52 affixed to tool bars 17 and 43 to which are pivotally connected laterally spaced pairs of vertically spaced generally parallel links 53 and 54, the rear ends of which are pivotally connected to a bracket 55 upon which is mounted a seed dispenser 56 adapted to discharge seed into the furrow made in the ground by a furrow opener 57 also carried by the bracket 55. Bracket 55 also supports a ground-engaging press and gauge wheel 58.

The mechanism, not shown, by which seed is discharged from dispenser 56 is driven by conventional sprocket and chain means, also not shown, carried by housing 59 which supports the press wheel. An arm 60 secured to housing 59 is adjustably connected by a sliding bolt 61 and a link 62 to bolt 63 by which link 53 is pivoted to bracket 55. Arm 60 is also connected by a spring 64 to an adjustable eye bolt 65 which is connected to a clip 66 mounted on pivot bolt 67 by which link 54 is pivoted to bracket 55. Down pressure is thus applied through spring 64 to hold wheel 58 in engagement with the ground for driving dispenser 56.

In order to provide support for the wing section 15 in the folded transport position and to elevate the earthworking units thereof sufficiently to avoid engagement of these units with the ground during transport, and thus avoid damage thereto, it will be observed that in the operating position of the implement shown in FIGURES 1 and 2, the hinge connection between wing 15 and the main or central frame section 14 formed by pivot pin 49 is tilted rearwardly during operation of the implement. When the implement is to be moved in its transport position it is raised on wheels 30 about the pivotal connection of hitch frame 21 to drawbar 12 of the tractor. Since the drawbar point remains fixed, were hinge 40 to be vertical in the operating position of the implement the wing section upon folding would be so close to the ground as to engage obstructions and damage the implement parts. By tilting pivot pin 49 rearwardly in the operating position thereof, as will be observed from FIGURE 3 the hinge 49 moves into a substantially vertically position when the implement is raised and all earthworking parts are elevated an adequate distance above the ground.

It may also be noted that when wing section 15 is folded into the transport position shown in dotted lines in FIGURE 1, the outer end of tool bar 43 overlaps and rests upon the adjacent brace member 23 of the hitch structure 21, providing additional support therefor in transport.

Laterally spaced beams 68 are affixed at their forward end to tool bars 17 and 43 and transversely extending platforms 69 and 70 are mounted on their rear ends. Beams 68 of central section 14 also have affixed thereto rearwardly of and parallel to tool bar 17, a tool bar 71, and axially aligned therewith is a tool bar 72 affixed to the beams 68 of each wing section 15. In the operating position of the implement as shown in FIGURES 1 and 2, beams 71 and 72 are in transverse alignment and the adjacent ends of the beams are provided with connecting plates 73 and 74, respectively. Plate 74 has pivotally mounted thereon bolts 75 receivable in slots 76 in plate 73, the plate being secured together by nuts 77. As shown in FIGURE 3, an extension 78 of beam 68 of the end or wing section 15 is pivoted to beam 68 by a bolt 79 and is notched at 80 to receive tool bar 72, permitting the platform 70 to be folded upwardly in the folded non-operating position thereof to avoid engagement with the tractor.

Tool bars 71 and 72 provide means for mounting on the implement a plurality of fertilizer distributing devices 81, one for each seed dispensing ground unit 51. A transverse rail 82 is affixed to brackets 83 mounted on tool bar 71 of the central section. A similar rail 84 is affixed to brackets 85 mounted on tool bar 72 of the end section 15.

Fertilizer hoppers 86 are mounted on rails 82 and 84 and the hoppers of the central section are driven by a transverse shaft 87 in transverse alignment with a driven shaft 88 carried by each of the end sections 15.

On shaft 87 of the central frame section adjacent each of the supporting wheels 30 are mounted sprocket wheels 87 each of which is drivingly connected by an endless chain 90 with a sprocket wheel 91 mounted on an axle 92 supported by arms 93 pivotally connected at 94 to a bracket 95 affixed to rail 82. A wheel 96 having a rubber tire 97 thereon is mounted on axle 92. The ends of each pair of arms 93 for each rail 94 are connected by a cross-piece 98. Each of the cross-pieces 98 is apertured to slidably receive a rod 99 the lower end of which is pivotally connected to a lug 100 affixed to the central frame and on the upper end of which is adjustably mounted a collar 101. A spring 102 surrounds rod 99 between collar 101 and cross-piece 98 and serves a purpose hereinafter to become clear.

In the operating position shown in FIGURES 1 and 2, each wheel 96 engages one of the ground wheels 30 with the rubber tire resting upon the surface of the pneumatic tire 103 mounted on wheel 30. The wheels 96 are thus driven by their frictional engagement with wheels 30, and are yieldably held in engagement therewith by the springs 102.

As shown in FIGURE 2, spring 102 is confined between cross-piece 98 and collar 101 and acts in compression to resiliently hold wheel 96 in engagement with wheel 30.

Drive is transmitted from shaft 87 to each of the end section shafts 88 by mechanism including a pair of axially projecting, radially spaced pins 104 carried by the end sprocket wheel 89 adapted to receive therein a radially extending bar 105 affixed to the inner end of shaft 88. Upon raising the implement to its transport position, wheel 96 moves out of contact with wheel 30 and disrupts the drive to shaft 87. Bolts 46 and 75 are loosened to allow wing section 15 to be folded forwardly about the axis of hinge pin 49, the drive connection between shaft 87 and shaft 88 being automatically released by removal of bar 105 from between pins 104. Upon return of wing sections 15 to their operating position bar 105 again becomes automatically seated between pins 104 and wheel 96 returns to operative frictional engagement with wheel 30.

It is believed that the construction and operation of the novel folding wing implement of this invention will be clearly understood from the foregoing description. It should likewise be understood that the invention has been described in its preferred embodiment and that modifications may be made therein without departing from the spirit of the invention or the scope of the appended claims.

What is claimed is:

1. In an implement having a transversely elongated tool-carrying frame vertically movable between operating and transport positions adapted for attachment to a tractor having a drawbar and including a central frame section having supporting wheels vertically movable relative thereto and folding end sections adapted to be swung horizontally from an operating position in transverse alignment with the central section to a non-operating transport position in tandem relation thereto, a hitch frame extending forwardly from the central section and pivotally connected to the tractor drawbar for vertical swinging relative thereto between a raised transport position on said wheels and a lowered operating position, hinge means connecting the inner end of each of said end sections to the adjacent outer end of said central section, said hinge means being mounted on the central frame section so that the hinge axis thereof is tilted at an acute angle in a vertical plane parallel to the direction of travel of the implement in the operating position thereof and is tilted to a substantially vertical position when the implement is raised to its transport position.

2. In an implement having a transversely elongated tool-carrying frame vertically movable between operating and transport positions adapted for attachment to a tractor having a drawbar and including a central frame section having supporting wheels vertically movable relative thereto and folding end sections adapted to be swung horizontally from an operating position in transverse alignment with the central section to a non-operating transport position in tandem relation thereto, hinge means, a hitch frame extending forwardly from the central section and pivotally connected to the tractor drawbar for vertical swinging relative thereto between a raised transport position on said wheels and a lowered operating position, connecting the inner end of each of said end sections to the adjacent outer end of said central section, said hinge means being mounted on the central frame section so that the hinge axis thereof is tilted at an acute angle in a vertical plane parallel to the direction of travel of the implement in the operating position thereof and is tilted to a substantially vertical position when the implement is raised to its transport position, a transverse drive shaft rotatably mounted on said central frame section, a driven shaft mounted on said end section in alignment with said drive shaft in the operating position of the end section, and cooperating drive transmitting means carried by and operatively connecting said shafts, said drive transmitting means being disengageable upon horizontal swinging of the end section about the axis of said hinge means to its non-operating position and automatically engageable upon return of said end section to its operating position.

3. The invention set forth in claim 2, wherein said drive transmitting means includes a rotatable member mounted on the end of said drive shaft having axial projections spaced about the axis thereof, and the adjacent end of said driven shaft has a radially disposed part receivable between and engageable with said projections upon rotation of the drive shaft.

4. In an implement adapted for attachment to a tractor having a drawbar and including a central frame section having supporting wheels vertically movable relative thereto and foldable end frame sections, a hitch frame extending forwardly from the central section and pivotally connected to the tractor drawbar for vertical swinging relative thereto between a raised transport position on said wheels and a lowered operating position, and hinge means connecting each of said end sections to said central section for horizontal swinging to a folded position relative to the central section, said hinge means being mounted on the central frame section so that the hinge axis is generally vertical in the transport position of the implement and tilted at an acute angle in a vertical longitudinal plane in the operating position thereof.

References Cited by the Examiner

UNITED STATES PATENTS

| | | | |
|---|---|---|---|
| 2,958,383 | 11/60 | Danielson | 172—456 |
| 2,970,658 | 2/61 | Kopaska | 172—456 |

FOREIGN PATENTS 22,299  11/61  Germany.

ANTONIO F. GUIDA, *Acting Primary Examiner.*

ARNOLD RUEGG, T. GRAHAM CRAVER,
*Examiners.*